(No Model.)
J. J. BARKER.
SHAFT SUPPORT FOR VEHICLES.
No. 445,277. Patented Jan. 27, 1891.
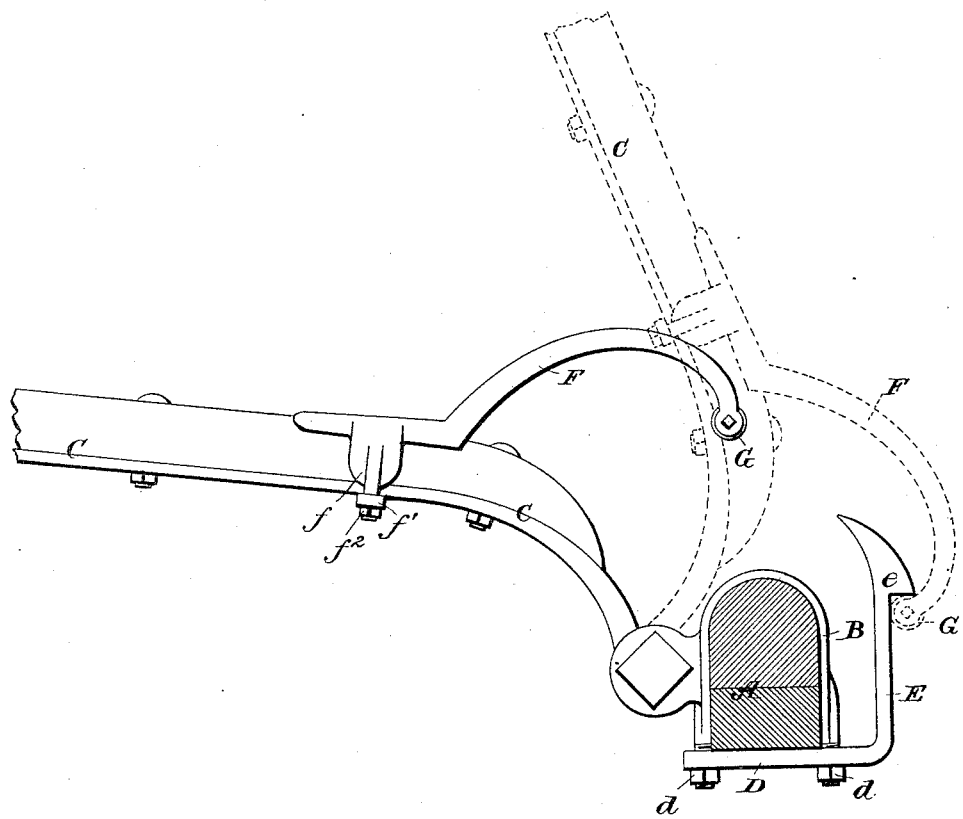

UNITED STATES PATENT OFFICE.

JEREMIAH JOHNSON BARKER, OF WASHINGTON, DISTRICT OF COLUMBIA, ASSIGNOR TO ANDREW B. WEBB, SAMUEL D. WEBB, AND MARTIN V. WEBB.

SHAFT-SUPPORT FOR VEHICLES.

SPECIFICATION forming part of Letters Patent No. 445,277, dated January 27, 1891.

Application filed November 6, 1890. Serial No. 370,520. (No model.)

*To all whom it may concern:*

Be it known that I, JEREMIAH JOHNSON BARKER, a citizen of the United States, residing at Washington, in the District of Columbia, have invented certain new and useful Improvements in Shaft-Supports for Vehicles; and I do declare the following to be a full, clear, and exact description of the invention, such as will enable others skilled in the art to which it appertains to make and use the same, reference being had to the accompanying drawing, and to the letters of reference marked thereon, which form a part of this specification.

My invention has relation to shaft or thill supports for vehicles, and the object is to provide a simple, cheap, and effective device for supporting the shafts in an elevated position when the vehicle is not in use; and to this end the novelty consists in the construction, combination, and arrangement of the parts of the same, as will be hereinafter more fully described, and particularly pointed out in the claim.

The figure in the drawing is a side elevation of my improved supporting device as it appears to one of the shafts and front axle of a vehicle, and the dotted lines show the shaft as it appears when supported.

A is the axle, B the thill-clip, and C the thill or shaft.

D is the yoke for securing the thill-clip B to the axle A by means of the nuts $d$ $d$. This yoke D is provided with an integral upwardly-extending arm E, terminating in a beveled tooth-shaped hood $e$.

F is a spring-arm provided at its base with an integral clip $f$, and by means of the yoke $f'$ and nuts $f^2$ it may be adjustably secured to the shaft C. The free end of this spring-arm F has mounted in it a friction-roller G, and the position of the arm F is so adjusted upon the shaft that when said shaft is elevated, as shown in dotted lines, the roller G will strike and ride downward upon the beveled face of the head $e$ and slide over and under, so as to catch under the said head and retain the shafts in an elevated position. The tension of the spring-arm F is so adjusted that while it will be retained in the elevated position, at the same time, when it is desired to lower the shafts, a slight downward presssure will cause the roller G, to roll from under the head $e$ and the shafts to be restored to their normal position.

In applying my supporter to a vehicle it is only necessary to remove the yoke under the thill-clip and replace it by the yoke D, which is provided with the arm E and head $e$. The spring-arm F is then placed upon the shaft and slightly secured by its yoke and nuts, the shafts on them elevated to the desired position, and the spring-arm F adjusted upon the shaft so that the roller G will be under the head $e$ of the yoke-arm D E and the nuts $f^2$ tightened, so as to firmly secure the spring-arm F to the shaft.

If desired, in the case of extra heavy shafts a pair of the supporters may be used, one on each shaft; but in practice I have found one set or pair amply sufficient in the case of nearly all one-horse light vehicles, and it will be readily observed that in applying my improved shaft-supporter to vehicles already built or in use no change is required in the existing parts, and it may readily and effectually be applied by any person, it being so simple as to dispense with the aid or services of a blacksmith or skilled mechanic.

Having thus fully described my invention, what I claim as new and useful, and desire to secure by Letters Patent of the United States, is—

A vehicle-shaft having secured to the upper side thereof a spring-arm having a roller in its free end, in combination with an axle having an upwardly-projecting arm terminating in an enlarged head adapted to engage the roller on the spring-arm and retain the shafts in an elevated position, substantially as described.

In testimony whereof I affix my signature in presence of two witnesses.

J. JOHNSON BARKER.

Witnesses:
HENRY J. ENNIS,
CHARLES M. IRELAN.